United States Patent Office 3,495,881
Patented Feb. 17, 1970

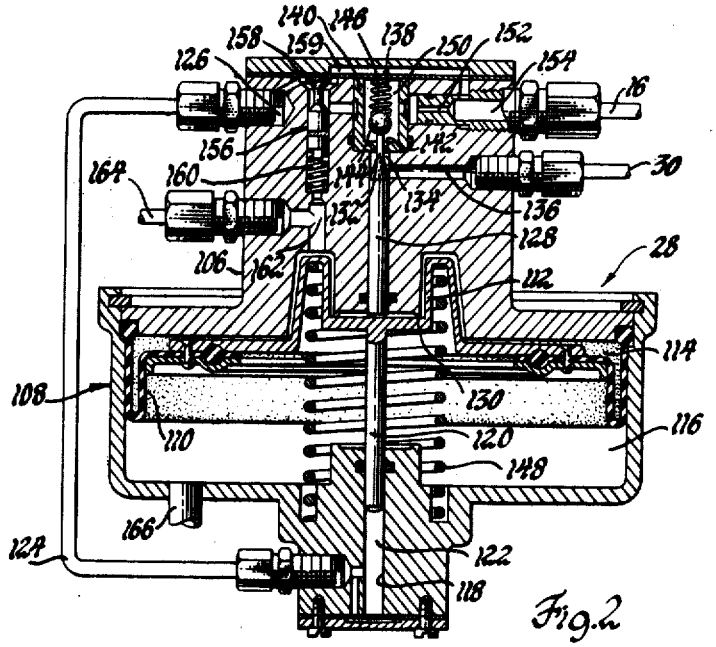
Fig. 2
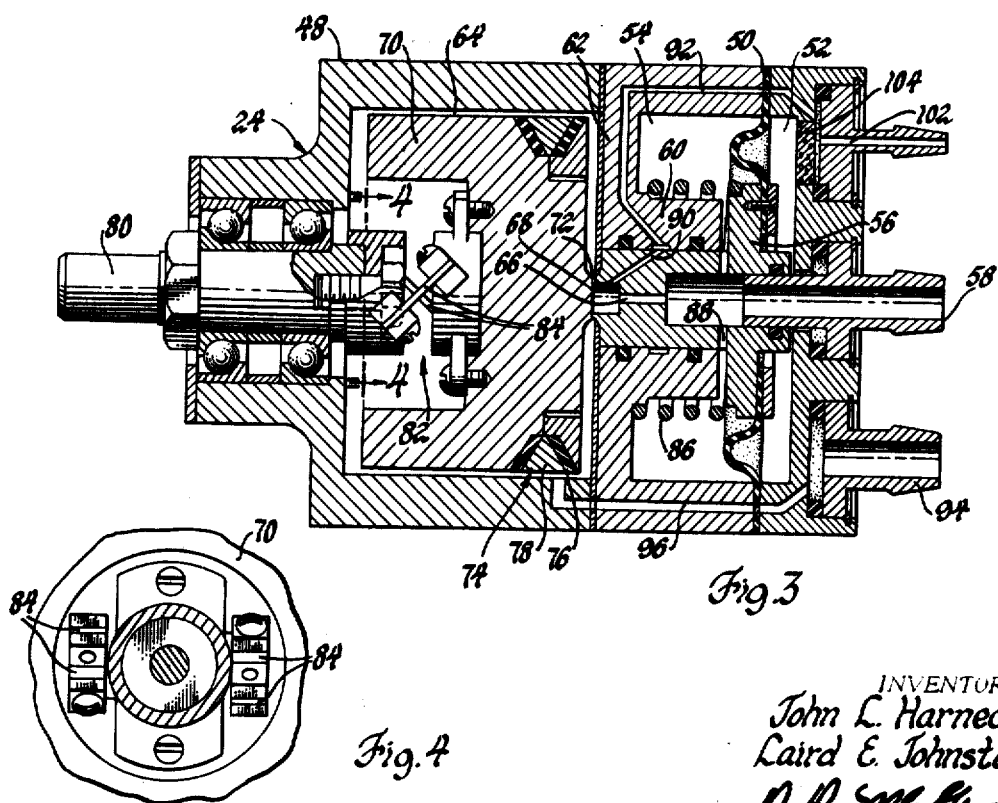
Fig. 3
Fig. 4
INVENTORS.
John L. Harned, &
Laird E. Johnston
ATTORNEY

3,495,881
ANTI-LOCK BRAKE CONTROL USING FLUID AMPLIFIER
John L. Harned, Grosse Pointe Woods, and Laird E. Johnston, Birmingham, Mich., assignors to General Motors Corporation, Detroit, Mich., a corporation of Delaware
Filed Aug. 5, 1968, Ser. No. 750,141
Int. Cl. B60t 8/02
U.S. Cl. 303—21                                   4 Claims

ABSTRACT OF THE DISCLOSURE

A vehicle road wheel anti-lock brake control system having a pneumatic accelerometer delivering an accelerometer output signal to a first stage proportional output signal fluid amplifier which controls a second stage bi-stable fluid amplifier to control a brake pressure modulator which acts on brake line pressure from a master cylinder to release the brake apply pressure at the road wheel brake to prevent excessive road wheel slip and to increase the brake apply pressure at the road wheel brake when the road wheel slip decreases to a desired value as indicated by road wheel acceleration.

---

The invention relates to a vehicle brake control system and more particularly to one which prevents wheel lockup during brake application. The system utilizes a fluid amplifier arrangement in which a pneumatic accelerometer signal is amplified to control a brake pressure modulator. The system requries no electrical components and operates with atmospheric pressure and subatmospheric pressure from a suitable vacuum source such as the engine intake manifold.

In the drawings:

FIGURE 2 is a cross section view of the brake pressure modulator contained in the system of FIGURE 1, with parts being broken away;

FIGURE 3 is a cross sectional view of the pneumatic accelerometer contained in the system of FIGURE 1; and FIGURE 4 is a cross section view taken in the direction of arrows 4—4 of FIGURE 3 and showing a portion of the pneumatic accelerometer, with parts broken away.

Figure 1:
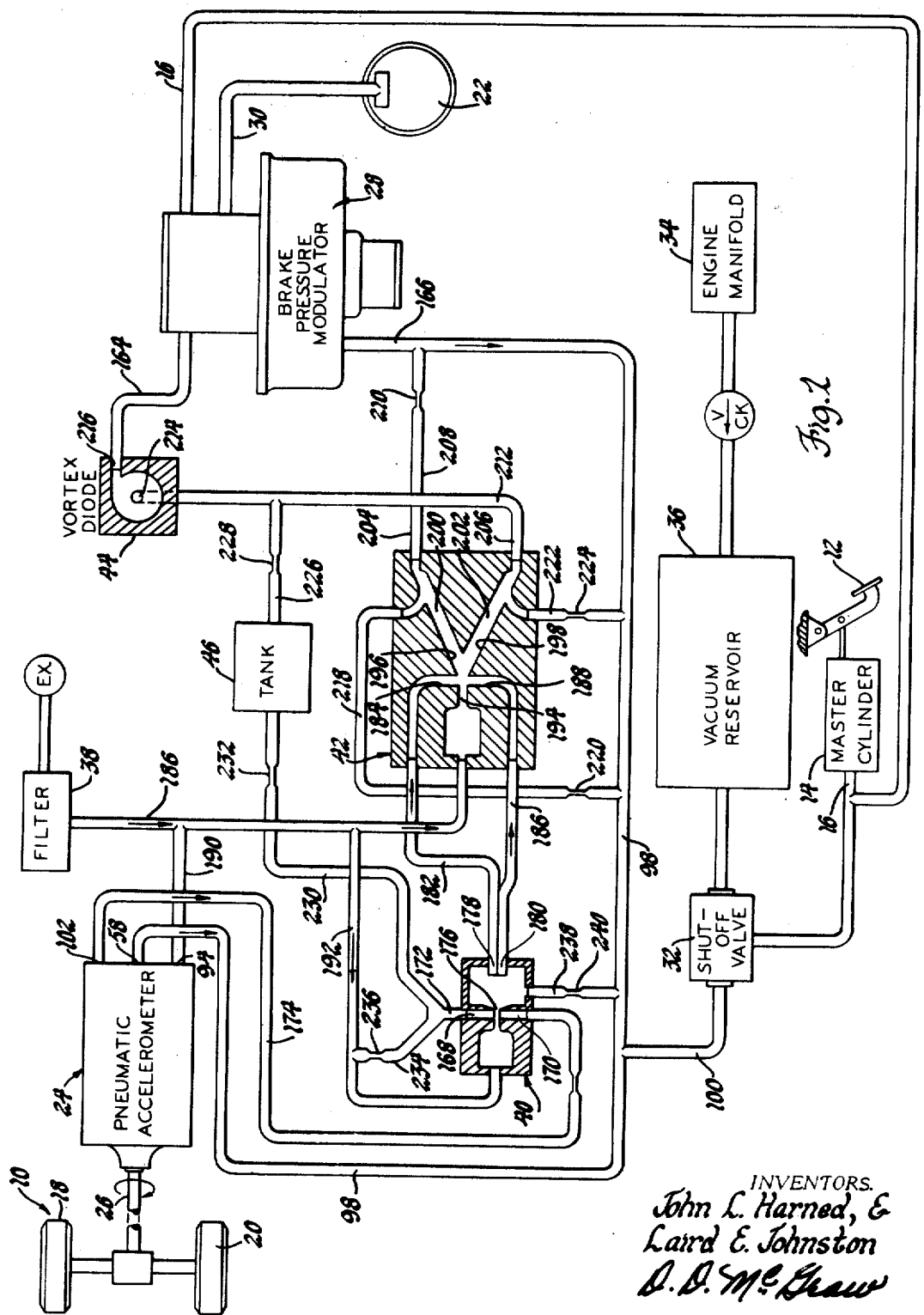
FIGURE 1 is a schematic representation of a system embodying the invention, which parts thereof being shown in section.

The vehicle brake system illustrated in FIGURE 1 for the vehicle 10 includes a brake pedal 12 suitably connected to actuate the master cylinder 14 to pressurize brake fluid in the brake line 16. In this instance only, the rear wheels 18 and 20 of the vehicle 10 are illustrated, and only one rear wheel brake assembly 22 is illustrated. In this installation, the rear wheels 18 and 20 are driven in the usual manner through a differential mechanism by a drive shaft and the pneumatic accelerometer 24 is suitably connected to be driven by the drive shaft as illustrated at 26. Other accelerometer drive installations may be used depending upon the desired system arrangement. If each wheel is to be controlled independently, an accelerometer would be driven by each wheel. Thus the system is readily adapted to the various types of anti-lock control arrangements. The brake pressure modulator 28 receives pressurized brake fluid from the master cylinder through the brake line 16 and transmits brake apply pressure to the wheel brake 22 through brake line 30. In the particular arrangement illustrated, brake apply pressure from brake line 30 would be delivered to each of the wheel brakes for wheels 18 and 20. Brake line pressure from the master cylinder 14 is also delivered to a shut-off valve 32.

The pneumatic portion of the system includes the engine intake manifold 34 as a source of subatmospheric or vacuum pressure, a vacuum reservoir 36, the vacuum portion of the shut-off valve 32, an atmospheric pressure air inlet schematically illustrated as including the filter 38, a proportional signal amplifier 40, a bi-stable amplifier 42, a vortex diode 44, a time delay tank 46, and suitable interconnecting conduits and conduit restrictions which will be described in greater detail.

Referring now to FIGURE 3 illustrating the pneumatic accelerometer 24 in detail, the housing 48 has a diaphragm 50 positioned therein and dividing one end of the housing into chambers 52 and 54. In the center of the diaphragm is a bushing member 56 which is slidable on the vacuum reservoir connection 58 and also within a cylindrical section 60 of the housing 48. The cylindrical section 60 is formed on the center portion of a web 62 which separates chamber 54 in one side of the housing from the flywheel chamber 64 in the other side of the housing. A fixed orifice 66 is provided in the bushing member 56 and extends longitudinally therethrough. A flapper nozzle 68 is provided as a part of the flywheel 70, which is rotatably mounted in the flywheel chamber 64. A valve seat 72 surrounds the end of fixed orifice 66 opening into flywheel chamber 64 and is engageable by nozzle 68. The flywheel 70 has a resonant damper 74 formed with a rubber mounting 76 in an annular groove of the flywheel, and an inertia ring 78 positioned in the rubber mounting. The accelerometer has a driven shaft 80 rotatably mounted to extend through the housing and into the flywheel chamber 64. Shaft 80 is connected by a flexure beam coupling 82 to drive the flywheel 70. Shaft 80 may be driven by one or more of the vehicle wheels or by the vertical propeller shaft. The flexure beam coupling 82 transmits the torque from driven shaft 80 needed to accelerate or decelerate the flywheel 70. The coupling is composed of two or more flexure beams 84 mounted at a 45° angle with respect to the axial center line of the shaft 80 and flywheel 70. Due to the 45° mounting angle, the flywheel will move relative to the driven shaft 80 in two directions when a torque change causes the flexure beams to bend. There will be a small angular windup and a small axial displacement of the flywheel. If the driven shaft 80 is being rotated in the counterclockwise direction, looking to the right at the outer end of shaft 80, as seen in FIGURE 3, acceleration will cause the flywheel to be displaced axially away from the driven shaft 80, while deceleration will cause the flywheel to move toward the driven shaft. Linear displacement to the right and to the left of the flywheel nominal position is directly proportional to wheel positive and negative acceleration amplitudes, respectively. Thus the flywheel and flexure beam coupling convert vehicle road wheel accelerations and decelerations to equivalent flywheel longitudinal displacements along the axial center line.

The flapper nozzle 68 cooperates with valve seat 72 and in turn converts flywheel longitudinal displacement into proportional pressure changes about a mean pressure. Since the valve seat 72 is attached to the diaphragm 50, it is movable along the center line of the flywheel axis. The return spring 86 positioned within the chamber 54 and having one end abutting web 62 and the other end abutting bushing member 56, maintains a force tending to move the valve seat 72 to the right away from the flywheel 70. This spring force is balanced by a diaphragm force generated by the difference in pressures in chambers 52 and 54. Vacuum reservoir pressure acts in chamber 54 through connection 58 and the cross passage 88 in bushing member 56. The pressure in chamber 52 is controlled through the passage 90 in bushing member 56 and the connecting passage 92 in the housing 48 by the flapper nozzle 68 and its relationship to the valve seat 72.

Atmospheric pressure air flows from the atmospheric pressure inlet port 94 through passage 96 and into the flywheel chamber 64. When shut-off valve 32 is open, air flow under control of the flapper nozzle 68 passes through the fixed orifice 66 and the vacuum reservoir connection 58 to the vacuum reservoir 36 through conduit 98, connecting conduit 100, and valve 32. An intermediate pressure exists in chamber 52 and also at the accelerometer pressure signal port 102. The porous plug 104 separates chamber 52 and port 102 and restricts air flow into and out of chamber 52 so that the response time of the self-balancing system is slow in comparison to the transient response time of vehicle road wheel positive and negative accelerations. The intermediate pressure, which is the wheel acceleraton signal generated by the accelerometer, is a function of the ratio of the resistance of fixed orifice 66 and the resistance at the flapper nozzle 68 as it co-operates with valve seat 72. This intermediate pressure acts on the right side of the diaphragm 50. If the diaphragm 50 is moved to the right by the return spring 86, the flapper nozzle resistance to flow decreases since the valve seat 72 moves away from the nozzle 68. This causes the intermediate pressure in chamber 52 to increase, in turn increasing the diaphragm force acting to the left to achieve a balance with the return spring force. Thus the entire mechanism attempts to maintain the longitudinal spacing between the flapper nozzle 68 and the valve seat 72 at a preselected value. Therefore, dynamic flywheel displacements generated by wheel positive and negative accelerations vary the flapper nozzle flow resistance to produce proportional pressure variations about the mean intermediate pressure at the accelerometer pressure signal port 102.

In a typical installation, the flywheel and flexure beam coupling form a mass-spring system that will be resonant at about 200 cycles per second. These resonant oscillations are damped by the resonant damper 74 to prevent false signals from being delivered to the system.

The brake pressure modulator 28 shown in detail in FIGURE 2 includes a modulator housing 106 which has a servo section 108 divided by a power diaphragm 110 and diaphragm hub 112 into an upper diaphragm chamber 114 and a lower diaphragm chamber 116. The portions of the housing 106 on either side of the diaphragm chambers have a common bore 118 extending therethrough. The portion of the bore 118 below the lower diaphragm chamber 116 contains a hydraulic balance piston 120 which is illustrated as being formed as a part of the diaphragm hub 112. The portion of the bore 118 below piston 120 forms a chamber 122 which is connected by conduit 124 to the port 126 at the other end of the housing 106. The portion of bore 118 above the upper diaphragm chamber 114 contains the hydraulic brake piston 128. The lower end of this piston extends through the diaphragm stop 130, formed as a part of housing 106, and engages the diaphragm hub 112. The upper end of piston 128 is tapered to form pin 132 which extends through chamber 134 formed by the upper end of bore 118. Conduit 30 is connected to port 136 which communicates with chamber 134. A valve assembly 138 is mounted at the upper end of bore 118 and includes a valve cup 140, the lower end of which is apertured to form a valve seat 142 through which pin 132 is extendable. The brake line cut-off valve 144 is contained within cup 140 and is urged toward the valve seat by spring 146. In the position shown in FIGURE 2, piston 128 is held upwardly by the diaphragm return spring 148 so that pin 132 holds valve 144 off its seat, thereby connecting chamber 134 with the valve chamber 150 formed by cup 140. The brake line orifice 152 connects chamber 150 and port 154 to which the master cylinder brake line 16 is connected. Chamber 150 is also connected to bypass valve assembly 156 in housing 106. This valve assembly is po-sitioned in a housing bore which has the upper end communicating with port 126 and chamber 150 under the control of the bypass valve 158. Port 126 is also directly connected with port 154 through passage 159 so that pressure in port 154 may act on the upper side of the bypass valve 158 without passing through the orifice 152. Valve 158 is urged to the normally open position by spring 160, and the end of the valve 158 on which spring 160 acts is fluid communicated to upper diaphragm chamber 114 by passage 162. This passage is connected to the vortex diode 44 through conduit 164. The lower diaphragm chamber 116 is connected by conduit 166 to conduit 100 and, therefore, to the vacuum reservoir 36 through the shut-off valve 32.

When the vehicle brake pedal 12 is initially depressed to energize the brakes, a large volume of brake hydraulic fluid flows at low pressure from the master cylinder to the wheel cylinders to take up the brake shoe clearance from the brake drum when drum brakes are utilized. This clearance will be taken up at about 50 p.s.i. brake apply pressure. Therefore, the preload on the bypass valve spring 160 is selected so that the valve closes at about the 50 p.s.i. brake pressure level. This pressure is transmitted to the upper side of bypass valve 158 through passage 159. Brake pressure is transmitted to chamber 134 so that it acts on the upper end of piston 128, and is also transmitted to chamber 122 through conduit 124 so that it acts on the lower end of piston 120. These pistons have the same cross section areas so that the forces generated by the brake pressure balance out at the diaphragm hub 112.

When the brake pressure modulator is connected to the pneumatic circuit as shown in FIGURE 1, the pressure differential across the diaphragm 110 and hub 112 is substantially zero, if there is no braking pressure or if the braking pressure is normal so that incipient wheel lock is not approached. This permits the diaphragm return spring 148 to hold the diaphragm hub against the stop 130.

The fluidic control circuit is a two-stage circuit in which the small signal from the accelerometer pressure signal port 102 is amplified to a level suitable for driving the brake pressure modulator 28. Hysteresis and time delay are purposely incorporated into the system. The first stage is the proportional signal amplifier 40, the input of which is the pressure differential across the two control ports 168 and 170. This differential depends upon the bias pressure and the accelerometer output pressure respectively delivered to port 168 by conduit 172 and to port 170 by conduit 174. The amount of deflection of the power jet at 176 is proportional to the pressure differential, and the deflection controls the first stage output signal, which is the pressure differential across the two receiver ports 178 and 180. Receiver port 178 is connected by conduit 182 to control port 184 of the bi-stable amplifier 42. Receiver port 180 is connected by conduit 186 to the control port 188 of the bi-stable amplifier 42. Thus the output signal from the first stage amplifier 40 is the input of the second stage amplifier 42. Air at atmospheric pressure passing through filter 38 is delivered through conduit 186 to conduit branches 190 and 192. Branch 190 connects with atmospheric pressure port 94 of the pneumatic accelerometer 24. Branch 192 connects with the proportional signal amplifier 40 and provides the pressure generating the power jet 176. Conduit 186 is also connected to the bi-stable amplifier 42 to generate the power jet 194 controlled by the pressures at control ports 184 and 188.

The bi-stable behavior of amplifier 42 is the result of the tendency of the power jet 194 to attach to one of the outer walls 196 and 198 of passages 200 and 202 downstream from the control ports. Passage 200 leads to output port 204, and passage 202 leads to output port 206. Conduit 208 connects the output port 204 to conduit 166 through restricter 210. Conduit 212 connects output port 206 with the center port 214 of the vortex diode 44. The tangential port 216 of the vortex diode is connected by conduit 164 to the modulator 28. Bi-stable amplifier passage 200 is connected by conduit 218 with conduit 98 through restricter 220. Passage 202 is connected to conduit 98 through conduit 222 and restricter 224. Conduit 98 is directly connected to conduit 166. Conduit 226 has restricter 228 therein and is connected at one end to conduit 212 between output port 206 and the vortex diode center port 214. The other end of conduit 226 is connected to the time delay tank 46. Conduit 230 contains restricter 232 and is connected at one end with time delay tank 46 and at the other end with conduit 172. Conduit 234 contains restricter 236 and is connected at one end with conduit 230 and at the other end with conduit 192.

In the steady state condition, with sufficient brake line pressure to hold valve 32 open, the air flow into the brake pressure modulator 28 is zero. The second stage bi-stable amplifier 42 is vented to the vacuum reservoir 36 through conduits 218 and 222. The first stage proportional signal amplifier 40 is also vented to the vacuum reservoir 36 through conduit 238 and restricter 240, primarily to achieve more linearity by minimizing the adverse pressure gradients. Time delay tank 46 is utilized to produce a delay feedback pressure rise at the first stage amplifier control port 168. This switches the bi-stable amplifier 42 to its off position after a suitable time delay. The various restricters in the circuit may be provided as porous restricter plugs and operate to produce proper impedance matching.

When the vehicle driver performs an emergency stop, he applies maximum force to the brake pedal 12, which causes the brake pressure output of the master cylinder 14 to build up in brake line 16 at a rapid rate. Initial depression of the brake pedal moves hydraulic fluid into the wheel cylinder of the wheel brake 22 under low pressure to take up the brake shoe-to-drum clearance. This low pressure hydraulic fluid flow passes through the open bypass valve assembly 156. When the mechanical clearance is taken up, the brake pressure begins to build up more rapidly. The bypass valve 158 in the modulator 28 is closed when this pressure increases to approximately 50 p.s.i. Additional required hydraulic fluid to the brake wheel cylinder must then pass through the brake line orifice 152. The amount of orifice restriction of this flow is selected to insure that the rate of brake apply pressure increase within the wheel cylinder does not generate a sufficiently large vehicle road wheel deceleration signal to initiate premature operation of the control system before the maximum tire braking force is reached.

Initial depression of the brake pedal and generation of brake line pressure opens the shut-off valve 32 to connect the vacuum reservoir 36 with conduit 100 and, therefore, with the remainder of the fluid amplifier circuit. When this valve opens the following events begin at the same time:

First, vacuum reservoir pressure is established in the accelerometer chamber 54, causing the valve seat 72 to move toward flapper nozzle 68 to close the orifice between the nozzle and the valve seat. This establishes vacuum reservoir pressure at the accelerometer pressure signal port 102. Pressure in chamber 52 of the accelerometer will then decrease in absolute value, causing the valve seat 72 to be moved away from the flapper nozzle 68 so as to re-establish the nominal nozzle opening. The initial activation of the accelerometer occurs in about the same length of time that it takes the driver to establish full braking pressure.

Second, the pressure at control port 170 of amplifier 40 is lower than the pressure at control port 168, thus deflecting the power jet 176 to the first stage receiver port 180. This in turn deflects the second stage amplifier power jet 194 to the second stage output passage 200, where it attaches to the passage wall 196. Pressure at the second stage output port 206 decreases almost instantaneously to a value close to vacuum reservoir pressure. This pressure also exists in the upper diaphragm chamber 114 of the brake pressure modulator 28, having been transmitted through conduit 112, vortex diode 44, and conduit 164.

Third, pressure in lower diaphragm chamber 114 rapidly decreases to vacuum reservoir pressure since that chamber is directly connected to the vacuum reservoir by conduits 100, 98, and 166. The diaphragm 110 and diaphragm hub 112 remain against the upper diaphragm stop 130 due to the return spring 148. Therefore, the brake line cut-off valve 144 remains open, and brake apply pressure and volume continue to be increased by hydraulic fluid flow through the open valve seat 142.

As the brake line pressure from the master cylinder delivered to the wheel brake 22 increases, the brake torque of the wheel will decelerate and generate a braking force between the tire and the road surface that is reflected to the wheel as tire torque opposing brake torque. When the brake torque increases above the maximum available tire torque as determined by the tire friction coefficient on the road surface, the wheel will decelerate rapidly and cause a corresponding increase in the accelerometer pressure signal at port 102 and the first stage proportional amplifier control port 170. Since the bias pressure at control port 168 is established as equal to the accelerometer zero wheel deceleration pressure signal appearing at control port 170, the increase in the pressure signal at control port 170 produces a proportional deflection of the power jet 176 toward the first stage receiver port 178. Prior to such deflection, and with the zero wheel deceleration pressure signal, the power jet 176 establishes equal output signal pressures at the receiver ports 178 and 180. Since the deflection of the power jet 176 causes a higher pressure to be delivered to receiver port 178, the pressure differential in the control ports 184 and 188 of the second stage amplifier 42 changes accordingly.

When the accelerometer pressure signal reaches a predetermined magnitude, the pressure differential at control ports 184 and 188 is sufficiently great to cause the bi-stable amplifier power jet 194 to detach from the wall 196 and to attach to the wall 198. This corresponds to the amplifier energized condition. The switching of the power jet 194 from output port 204 to output port 206 causes a large flow through conduit 212 and the vortex diode 44, which offers a low resistance to flow into the upper diaphragm chamber 114 of the brake pressure modulator 28. Since the lower diaphragm chamber 116 has been evacuated, and the pressure is increasing in the upper diaphragm chamber 114, the pressure differential across the diaphragm 110 increases, overcoming the force of spring 148 and causing the diaphragm, the diaphragm hub 112, and the hydraulic balance piston 120 to move rapidly downward. The brake pressure in chamber 134 causes the piston 128 to follow the downward movement of the diaphragm hub 112, withdrawing pin 132 and closing the brake line cut-off valve 144. The diaphragm assembly continues to move rapidly downward and the hydraulic brake piston 128 continues to move downwardly with it since chamber 134 is at the wheel cylinder brake apply pressure. Chamber 134 therefore expands, expanding the wheel cylinder hydraulic fluid volume which in turn lowers the brake apply pressure and decreases the brake force and rapidly decreases the brake torque.

When the brake torque decreases so that it is less than the tire torque, the vehicle wheel will begin to accelerate from a wheel slip condition toward a free rolling condition. When the wheel acceleration is increased sufficiently, a corresponding pressure decrease in the accelerometer pressure signal will occur, acting at control port 170 and in cooperation with the pressure at control port 168 to deflect the first stage power jet 176 toward receiver port 180. This generates a different pressure differential at the control ports 184 and 188 of the second stage amplifier 42. The pressure differential changes with changes in wheel acceleration. When the accelerometer pressure signal decreases to a predetermined magnitude, the pressure differential at control ports 184 and 188 is sufficiently great to cause the second stage power jet 194 to detach from the wall 198 and attach to the wall 196. Therefore the pressure at the output port 206 decreases instantly to a value close to vacuum reservoir pressure since the port is connected to the vacuum reservoir through conduit 222. Since the pressure in the brake pressure modulator chamber 114 is higher than the pressure at the output port 206, air will flow from the modulator chamber through conduit 164 to the vortex diode 44. The vortex diode offers a large resistance to flow from the modulator so that the diaphragm 110 and the diaphragm hub 112 will move upwardly at a slower rate than would otherwise occur, causing the brake apply pressure at the wheel cylinder to increase slowly. This is accomplished since upward movement of the diaphragm hub 112 causes upward movement of the hydraulic brake piston 128, decreasing the volume of chamber 134 and therefore increasing the brake apply pressure delivered to the wheel brake through passage 136 and conduit 30. As the brake apply pressure increases, the brake torque will increase and the road wheel will again be decelerated. The cycle can be repeated as necessary. Normal operation of the system may be set so as to cause the brake torque to cycle around a mean brake torque value which approaches the maximum brake torque available, with a typical brake torque limit cycle frequency of 8–10 cycles per second.

The time delay tank 46 and the restricters 228 and 232 form a portion of the pneumatic circuit which prevents the second stage amplifier 42 from remaining energized for a prolonged period of time which would cause the brake pressure to decrease to zero and result in a complete loss of wheel braking. When the second stage amplifier 42 is energized, the tank pressure in tank 46 slowly increases. If amplifier 42 remains energized for a prolonged time period, the tank pressure becomes sufficiently great and will be transmitted to control port 168 so as to operate the first stage amplifier 40 to change the proportional signal delivered to the second stage amplifier control ports 184 and 188 and cause the second stage amplifier to return to its deenergized condition.

When the brake pedal 12 is released, the shut-off valve 32 closes, and all of the pneumatic circuitry except the vacuum reservoir 36 returns to atmospheric pressure. The system then generates no signals and performs no function until the master cylinder is again pressurized and the valve 32 is again opened.

What is claimed is:
1. A vehicle wheel braking control system comprising:
    an accelerometer driven in accordance with the speed of at least one vehicle road wheel and generating a wheel acceleration signal corresponding to the amount of positive or negative wheel acceleration;
    a proportional signal amplifier receiving said wheel acceleration signal and generating an amplified wheel acceleration signal;
    a bi-stable switching amplifier receiving said amplified wheel acceleration signal and producing first and second output signals;
    a vehicle wheel braking system including a source of braking pressure, vehicle wheel brake means applied to decelerate the vehicle road wheels when wheel brake pressure is delivered to the wheel brake means from the braking pressure source, and a vehicle brake apply pressure modulator receiving braking pressure from the braking pressure source and delivering wheel brake pressure to the wheel brake means associated with said at least one vehicle road wheel;
    said brake apply pressure modulator also receiving said first and second output signals and changing the braking pressure from said braking pressure source to the delivered wheel brake pressure in accordance with said first and second output signals to prevent excessive vehicle road wheel slip.

2. The system of claim 1, said accelerometer generated wheel acceleration signal being a fluid pressure signal and said proportional signal amplifier being a fluid amplifier having a control port connected to receive said wheel acceleration signal.

3. The system of claim 1, said amplified wheel acceleration signal being a fluid pressure signal generated by said proportional signal amplifier as two proportional pressures,
    said bi-stable switching amplifier being a fluid amplifier having two opposed control ports respectively connected so that each receives one of said two proportional pressures,
    said first output signal from said bi-stable switching amplifier being delivered to said modulator to cause said modulator to release the wheel brake apply pressure acting on said wheel brake means to a lesser value,
    and said second output signal being delivered to said modulator to cause said modulator to increase wheel brake pressure delivered to said wheel brake means subject to braking pressure as a limitation of pressure increase.

4. A vehicle wheel anti-lock system comprising:
    a brake master cylinder,
    a vehicle wheel brake adapted to be actuated by brake pressure from said master cylinder,
    a brake pressure modulator intermediate said master cylinder and said wheel brake and controllable to modify the brake apply pressure delivered to said wheel brake,
    a source of subatmospheric fluid pressure and a source of atmospheric fluid pressure,
    a pneumatic accelerometer receiving fluid pressures from said sources and driven by at least one vehicle wheel to sense positive and negative accelerations thereof and generate an acceleration fluid pressure signal from fluid pressures from said sources,
    a proportional signal amplifier receiving said acceleration fluid pressure signal at one control port and fluid pressures from said pressure sources to generate an amplified acceleration fluid pressure output signal,
    a bi-stable switching amplifier receiving said amplified acceleration fluid pressure output signal and fluid pressures from said pressure source and generating first and second fluid output signals,
    a first conduit connecting said bi-stable switching amplifier to said brake pressure modulator to deliver said first fluid output signal to said modulator to actuate the modulator to decrease the wheel brake apply pressure,
    a second conduit connecting said bi-stable switching amplifier to said brake pressure modulator to deliver said second fluid output signal to said modulator to actuate the modulator to increase the wheel brake apply pressure,
    and a vortex diode in said first conduit permitting free signal fluid flow from said bi-stable amplifier and resisting fluid flow from said modulator.

References Cited
UNITED STATES PATENTS

| 3,369,845 | 2/1968 | Leonard | 188—181 X |
| 3,441,320 | 4/1969 | Flory | 188—181 X |

MILTON BUCHLER, Primary Examiner

JOHN J. McLAUGHLIN, Jr., Assistant Examiner

U.S. Cl. X.R.

188—181

PO-1050
(5/69)

UNITED STATES PATENT OFFICE
CERTIFICATE OF CORRECTION

Patent No. 3,495,881        Dated February 17, 1970

Inventor(s) John L. Harned and Laird E. Johnston

It is certified that error appears in the above-identified patent and that said Letters Patent are hereby corrected as shown below:

Column 1, line 36, the word "which" should read -- with --.
Column 2, line 34, the word "vertical" should read -- vehicle --.

SIGNED AND
SEALED
AUG 18 1970

(SEAL)
Attest:

Edward M. Fletcher, Jr.
Attesting Officer

WILLIAM E. SCHUYLER, JR.
Commissioner of Patents